(12) United States Patent
Chen

(10) Patent No.: US 11,552,493 B2
(45) Date of Patent: Jan. 10, 2023

(54) CHARGING CONTROL METHOD, CHARGING CONTROL DEVICE AND DEVICE TO BE CHARGED

(71) Applicant: GUANGDONG OPPO MOBILE TELECOMMUNICATIONS CORP., LTD., Guangdong (CN)

(72) Inventor: Wei Chen, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 156 days.

(21) Appl. No.: 16/758,616

(22) PCT Filed: Dec. 21, 2018

(86) PCT No.: PCT/CN2018/122847
§ 371 (c)(1),
(2) Date: Apr. 23, 2020

(87) PCT Pub. No.: WO2020/124595
PCT Pub. Date: Jun. 25, 2020

(65) Prior Publication Data
US 2021/0210970 A1  Jul. 8, 2021

(51) Int. Cl.
*H02J 7/00* (2006.01)
*H01M 10/44* (2006.01)
(Continued)

(52) U.S. Cl.
CPC ....... *H02J 7/007182* (2020.01); *H01M 10/44* (2013.01); *H02J 7/0013* (2013.01);
(Continued)

(58) Field of Classification Search
USPC .......................................................... 320/125
See application file for complete search history.

(56) References Cited

U.S. PATENT DOCUMENTS 5,633,576 A   5/1997  Rose et al.
6,104,165 A   8/2000  Miyamoto et al.
(Continued)

FOREIGN PATENT DOCUMENTS

CN   201409003 Y   2/2010
CN   101800344 A   8/2010
(Continued)

OTHER PUBLICATIONS

Japanese Office Action with English Translation for JP Application 2020-513605 dated Apr. 16, 2021. (10 pages).
(Continued)

*Primary Examiner* — Samuel Berhanu
(74) *Attorney, Agent, or Firm* — Young Basile Hanlon & MacFarlane, P.C.

(57) ABSTRACT

Embodiments of the present disclosure provide a charging control method, a charging control device and a device to be charged. The method includes: in a charging process, performing K constant current charging stages on a battery in the device to be charged, where K is a positive integer greater than or equal to 1; in each constant current charging stage, performing constant current charging on the battery with a preset current corresponding to the constant current charging stage until the battery is charged to a preset voltage corresponding to the constant current charging stage, wherein the preset voltage corresponding to the Kth constant current charging stage is a charging cut-off voltage greater than a rated voltage of the battery; and when the voltage of the battery reaches the charging cut-off voltage in the Kth constant current charging stage, stopping charging the battery.

20 Claims, 4 Drawing Sheets

--- in a charging process of the device to be charged, performing K constant current charging stages on a battery in the device to be charged, wherein K is a positive integer greater than or equal to 1 — S301 in each constant current charging stage of the K constant current charging stages, performing constant current charging on a battery with a preset current corresponding to the constant current charging stage until the battery is charged to a preset voltage corresponding to the constant current charging stage, wherein the preset voltage corresponding to the Kth constant current charging stage is a charging cut-off voltage greater than a rated voltage of the battery — S302 when the voltage of the battery is detected to reach the charging cut-off voltage in the Kth constant current charging stage, stopping charging the battery — S303

(51) Int. Cl.
*H02J 7/02* (2016.01)
*H02J 50/00* (2016.01)

(52) U.S. Cl.
CPC ........ *H02J 7/0047* (2013.01); *H02J 7/00714* (2020.01); *H02J 7/02* (2013.01); *H02J 50/00* (2016.02); *H02J 2207/20* (2020.01)

(56) References Cited

U.S. PATENT DOCUMENTS

| | | | |
|---|---|---|---|
| 8,519,671 B2* | 8/2013 | Bao | H02J 7/0071 320/128 |
| 2010/0327810 A1* | 12/2010 | Jimbo | H02J 7/0071 320/126 |
| 2011/0121790 A1 | 5/2011 | Brandon, II | |
| 2011/0267009 A1 | 11/2011 | Nakatsuji et al. | |
| 2011/0285359 A1 | 11/2011 | Chang et al. | |
| 2014/0009120 A1* | 1/2014 | Kim | H02J 7/00045 320/138 |
| 2016/0181832 A1 | 6/2016 | Hatano et al. | |
| 2018/0205234 A1 | 7/2018 | Zhang et al. | |

FOREIGN PATENT DOCUMENTS

| | | | |
|---|---|---|---|
| CN | 102769156 A | | 11/2012 |
| CN | 103107378 A | | 5/2013 |
| CN | 103490111 A | | 1/2014 |
| CN | 106160081 A | | 11/2016 |
| CN | 206575193 | * | 3/2017 |
| CN | 106887884 A | | 6/2017 |
| CN | 206575193 U | | 10/2017 |
| CN | 107808987 A | | 3/2018 |
| JP | H08203563 A | | 8/1996 |
| JP | H09007643 A | | 1/1997 |
| JP | H10145979 A | | 5/1998 |
| JP | H1197074 A | | 4/1999 |
| JP | 2012228041 A | | 11/2012 |
| KR | 20120124801 A | | 11/2012 |
| RU | 2583151 C1 | | 5/2016 |
| WO | 2010079563 A1 | | 7/2010 |
| WO | 2012127775 A1 | | 9/2012 |
| WO | 2018028563 A1 | | 2/2018 |

OTHER PUBLICATIONS

Canadian Office Action for CA Application 3,073,381 dated May 7, 2021. (6 pages).
OA for AU application 2018437253 dated Oct. 6, 2020.
OA for EP application 18941944.3 dated Nov. 11, 2020.
OA for IN application 202017007931 dated Nov. 18, 2020.
Japanese Office Action with English Translation for JP Application 2020-513605 dated Sep. 14, 2021.(12 pages).
Korean Office Action with English Translation for KR Application 10-2020-7005866 dated Aug. 6, 2021. (10 pages).
English translation of ISR for PCT application PCT/CN2018/122847 dated Sep. 27, 2019.
Chinese First Office Action with English Translation for CN Application 201880036941.7 dated Apr. 29, 2022. (15 pages).
Korean First Decision on Rejection with English Translation for KR application 10-2020-7005866 dated Feb. 9, 2022.
Japan Decision on Rejection with English Translation for JP Application 2020-513605 dated Feb. 15, 2022.
Russia Office Action with English Translation for RU application 2020110325 dated Mar. 22, 2022.
Korena Second Decision on Rejection with English Translation for KR application 10-2020-7005866 dated Apr. 20, 2022.

* cited by examiner

```
┌─────────────────────────────────────────────────────────────┐
│ in a charging process of the device to be charged, performing K constant current │
│ charging stages on a battery in the device to be charged, wherein K is a positive │──S301
│              integer greater than or equal to 1             │
└─────────────────────────────────────────────────────────────┘
                                │
                                ▼
┌─────────────────────────────────────────────────────────────┐
│ in each constant current charging stage of the K constant current charging stages, │
│ performing constant current charging on a battery with a preset current corresponding │──S302
│ to the constant current charging stage until the battery is charged to a preset voltage │
│   corresponding to the constant current charging stage, wherein the preset voltage │
│  corresponding to the Kth constant current charging stage is a charging cut-off voltage │
│              greater than a rated voltage of the battery    │
└─────────────────────────────────────────────────────────────┘
                                │
                                ▼
┌─────────────────────────────────────────────────────────────┐
│ when the voltage of the battery is detected to reach the charging cut-off voltage in the │──S303
│     Kth constant current charging stage, stopping charging the battery │
└─────────────────────────────────────────────────────────────┘
```

FIG. 3

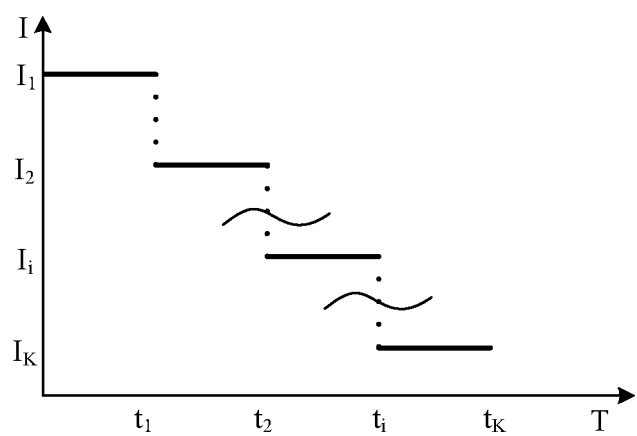

FIG. 4

CHARGING CONTROL METHOD, CHARGING CONTROL DEVICE AND DEVICE TO BE CHARGED

CROSS-REFERENCE TO RELATED APPLICATION(S)

This application is a 371 application of International Application No. PCT/CN2018/122847, filed on Dec. 12, 2018, the entire disclosure of which is hereby incorporated by reference.

TECHNICAL FIELD

The present disclosure relates to the field of charging technology, and more particularly, to a charging control method, a charging control device and a computer storage medium.

BACKGROUND

At present, a charging process of an electronic device can be divided into a trickle current charging stage, a constant current charging stage and a constant voltage charging stage. In the existing charging process, after detecting that a voltage of a battery reaches a constant current charging voltage point, a constant voltage charging is performed, and the process is remained in the constant voltage charging stage until a charging cut-off condition is satisfied, and then the process is ended. Moreover, the charging voltage in the entire constant voltage charging stage does not exceed a rated voltage of the battery. Thus, since the constant voltage charging duration is long, the entire charging duration is long, which wastes time and also reduces the charging speed.

SUMMARY

In a first aspect, embodiments of the present disclosure provide a charging control method. The method is applicable for a device to be charged. The method includes: in a charging process of the device to be charged, performing K constant current charging stages on a battery in the device to be charged, in which K is a positive integer greater than or equal to 1;
in each constant current charging stage of the K constant current charging stages, performing constant current charging on the battery with a preset current corresponding to the constant current charging stage until the battery is charged to a preset voltage corresponding to the constant current charging stage, in which the preset voltage corresponding to the Kth constant current charging stage is a charging cut-off voltage greater than a rated voltage of the battery; and
when the voltage of the battery is detected to reach the charging cut-off voltage in the Kth constant current charging stage, stopping charging the battery.

In a second aspect, embodiments of the present disclosure provide a charging control device. The charging control device is applicable for a device to be charged, and includes a charging unit, and a control unit.

The charging unit is configured to, in a charging process of the device to be charged, perform K constant current charging stages on a battery in the device to be charged, in which K is a positive integer greater than or equal to 1.

The charging unit is further configured to, in each constant current charging stage of the K constant current charging stages, perform constant current charging on the battery with a preset current corresponding to the constant current charging stage until the battery is charged to a preset voltage corresponding to the constant current charging stage, in which the preset voltage corresponding to the Kth constant current charging stage is a charging cut-off voltage greater than a rated voltage of the battery.

The control unit is configured to, when the voltage of the battery reaches the charging cut-off voltage in the Kth constant current charging stage, stop charging the battery.

In a third aspect, embodiments of the present disclosure provide a device to be charged. The device to be charged includes a battery, and the charging control device according to any one of embodiments of the second aspect.

BRIEF DESCRIPTION OF DRAWINGS

FIG. 3 is a flowchart of a charging control method according to an embodiment of the present disclosure.

FIG. 4 is a schematic diagram of a charging control technology according to an embodiment of the present disclosure.

DETAILED DESCRIPTION

Figure 1:
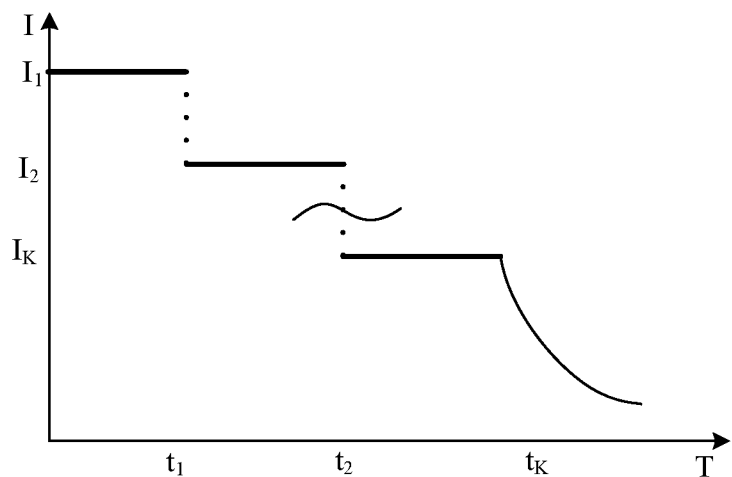
FIG. 1 is a schematic diagram of a stepped charging technology in the related art.

In order to understand the features and technical contents of embodiments of the present disclosure, the implementation of the embodiments of the present disclosure is described in detail below with reference to the accompanying drawings. The accompanying drawings are merely used for illustration, and are not used to limit embodiments of the present disclosure.

With the rapid development of charging technology, the existing charging technology may be divided into wired charging technology and wireless charging technology. When a user charges a device to be charged, the device to be charged is connected with a charging device (e.g. different types of adapters) through a charging cable to realize charging of the device to be charged, which is called as the wired charging technology. However, when the charging cable is lost or the user desires a certain distance between the device to be charged and the charging device, the device to be charged can be charged by wireless charging technologies. The wireless charging technologies are derived from the wireless power transmission technology. According to different wireless charging principles, the wireless charging mode is mainly divided into an electromagnetic induction mode (or magnetic coupling mode), a radio wave mode and an electromagnetic resonance mode. Taking the device to be charged adopting the wireless charging technology in the electromagnetic induction mode as an example, the device to be charged and the charging device (e.g. a wireless charging base) deliver energy therebetween through a magnetic field, and no charging cable is required between the two to charge the device to be charged.

It is understood that regardless of the present charging process adopts the wired charging technology or the wireless charging technology, the present charging process usually includes a constant current (CC) charging stage and a constant voltage (CV) charging stage. However, constant voltage charging is a charging stage with a long charging duration. If the constant voltage charging duration in charging is effectively reduced, the charging duration of the battery in the device to be charged is greatly improved, which is the focus of present research and a technical problem that needs to be solved in embodiments of the present disclosure.

In the related technical solution, the conventional charging process first performs charging with a constant current charging current until a limited voltage is reached, the limited voltage not exceeding the rated voltage of the battery in the device to be charged, and then performs constant voltage charging under the limited voltage. In the entire charging process, the charging voltage does not exceed the rated voltage of the battery. Due to the long duration of the constant voltage charging, the charging duration of the entire charging process is lengthened.

In order to shorten the charging duration, the stepped charging technology is becoming more and more popular as a fast charging scheme. The existing stepped charging technology still retains a constant voltage charging stage. The charging principle is provided as follows. In the charging process of the device to be charged, constant current charging is performed with a first charging current first, to charge the battery to a first limited voltage. Then, the first charging current is reduced to a second charging current, and constant current charging is performed with the second charging current until the battery is charged to a second limited voltage. The charging current is gradually decreased, and the above steps are repeated. When the constant current charging is performed with the nth charging current, to charge the battery to a nth limited voltage (the nth limited voltage does not exceed the rated voltage of the battery), constant voltage charging is finally performed with the nth limited voltage until the charging current drops to a cut-off current of the battery, in which n is a positive integer greater than or equal to 1.

FIG. 1 is a schematic diagram of a stepped charging technology in the related art. As illustrated in FIG. 1, the abscissa represents time (T), and the ordinate represents charging current (I). First, the constant current charging is performed with a first charging current $I_1$. After a first charging time $t_1$, the battery is charged to a first limited voltage $V_1$, and the charging current is decreased from the first charging current $I_1$ to a second charging current $I_2$, and then constant current charging is performed with the second charging current $I_2$. After a second charging time $t_2$, the battery is charged to the second limited voltage $V_2$. The charging current is gradually decreased, and the above steps are repeated. After the constant current charging is performed with a nth charging current Into charge the battery to a nth limited voltage $V_n$ (i.e., a charging cut-off voltage $V_{end}$), constant voltage charging is performed with the nth limited voltage $V_n$ until the charging current drops to a cut-off current $I_{end}$, in which the nth limited voltage $V_n$ does not exceed the rated voltage of the battery.

In the related technical solution, although the stepped charging technology is proposed, the constant voltage charging stage is still retained in the charging process, and the charging voltage does not exceed the rated voltage of the battery in the entire constant voltage charging stage. Therefore, there is room for further improvement of reducing the charging duration of the device to be charged.

On this basis, embodiments of the present disclosure provide a charging control method. The method is applicable for a device to be charged. In a charging process of the device to be charged, K constant current charging stages are performed on the battery in the device to be charged, wherein K is a positive integer greater than or equal to 1. In each constant current charging stage of the K constant current charging stages, constant current charging is performed on the battery with a preset current corresponding to the constant current charging stage until the battery is charged to a preset voltage corresponding to the constant current charging stage, wherein the preset voltage corresponding to the Kth constant current charging stage is a charging cut-off voltage that is greater than a rated voltage of the battery. When the voltage of the battery is detected to reach the charging cut-off voltage in the Kth constant current charging stage, charging the battery is stopped. Since the charging process adopts multi-stage constant current charging, and charging the battery is stopped after the Kth constant current charging stage, that is, the constant voltage charging stage is cancelled, the purpose of saving charging time and increasing charging speed is achieved.

It should be noted that the "device to be charged" may refer to a terminal. The terminal may include, but is not limited to, a device configured to receive/transmit communication signals via a wired connection (for example, public switched telephone network (PSTN), digital subscriber line (DSL) connection, digital cable connection, direct cable connection and/or another data connection/network) and/or via a wireless interface (for example, cellular network, wireless local area network (WLAN), digital TV network such as digital video broadcasting handheld (DVB-H) network, satellite network, an amplitude modulation-frequency modulation (AM-FM) broadcasting transmitter, and/or a wireless interface of another communication terminal). The terminal configured to communicate via the wireless interface may be referred to as "wireless communication terminal", "wireless terminal" and/or "mobile terminal". Examples of a mobile terminal include, but are not limited to a mobile phone, a tablet, a laptop, a personal digital assistant (PDA), a portable media player (PMP), and a navigation device, may also include, stationary terminal device such as a desktop computer, and a digital TV. In addition, the device to be charged in embodiments of the present disclosure may further include a mobile power source capable of storing the received charging energy to provide energy to other electronic devices, which is not specifically limited in embodiments of the present disclosure.

Figure 2:
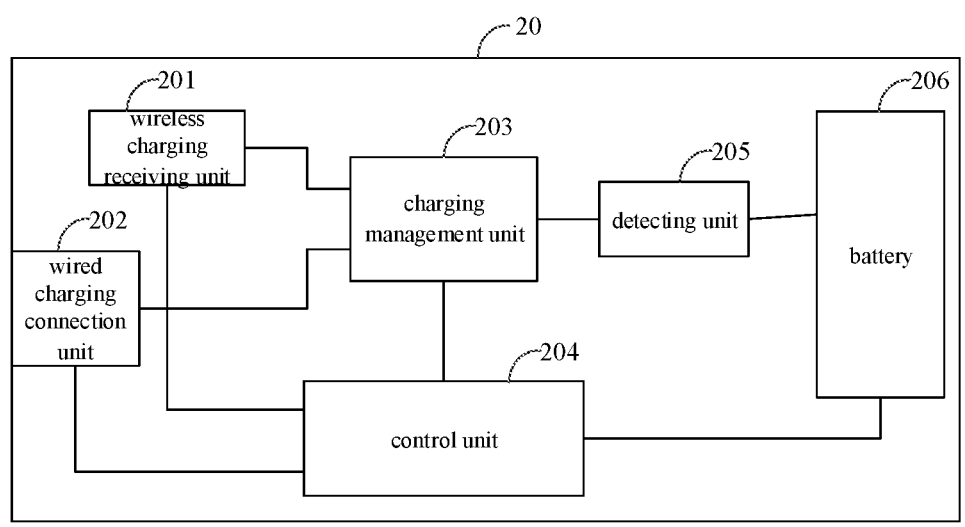
FIG. 2 is a block diagram of a device to be charged according to an embodiment of the present disclosure.

FIG. 2 is a block diagram of a device to be charged according to an embodiment of the present disclosure. As illustrated in FIG. 2, the device to be charged 20 includes a wireless charging receiving unit 201, a wired charging connection unit 202, a charging management unit 203, a control unit 204, a detecting unit 205, and a battery 206. It may be understood by those skilled in the art that the composition of the device to be charged 20 shown in FIG. 2 does not constitute limitation on a structure of the device to be charged, and the device to be charged may include more or less components than those illustrated, or combine some components may be combined, or adopt different component arrangements.

It should be noted that, in some embodiments, the wireless charging receiving unit 201 and the wired charging connection unit 202 may not be included in the device to be charged 20 at the same time. When the device to be charged 20 supports only the wireless charging mode, the device to be charged 20 may only include the wireless charging receiving unit 201. When the device to be charged 20 only supports the wired charging mode, the device to be charged 20 may include only the wired charging connection unit 202. When the device to be charged 20 supports both the wireless charging mode and the wired charging mode, the device to be charged 20 may include both the wireless charging receiving unit 201 and the wired charging connection unit 202. This is not specifically limited in embodiments of the present disclosure.

It should also be noted that an external wired charging device (such as an adapter) can be wiredly connected to the device to be charged 20 through a charging cable. Specifically, the external wired charging device is connected to the wired charging connection unit 202 through a charging cable, and the intercommunication is implemented by a communicating and charging handshake protocol. The external wireless charging device (such as a wireless charging base) can be wirelessly connected to the device to be charged 20 through electromagnetic induction. Specifically, the external wireless charging device is wirelessly connected to the wireless charging receiving unit 201 by an internal wireless charging transmitting unit through magnetic induction.

In some embodiments, the wireless communication includes, but is not limited to, Bluetooth communication, Wireless Fidelity (WiFi) communication, short-range wireless communication based on high carrier frequency, optical communication, ultrasonic communication, ultra-wideband communication, and mobile communication, which is not specifically limited in the embodiments of the present disclosure.

In some embodiments, the wireless charging receiving unit 201 includes a receiving coil and an AC/DC converting unit. The receiving coil is configured to convert wireless charging signals transmitted by the wireless charging device into alternating current, and the AC/DC converting unit is configured to convert the alternating current into a stable direct current by performing operations such as rectification and/or filtering on the alternating current, to charge the battery 206.

In some embodiments, the wired charging connection unit 202 includes a universal serial bus USB interface for connecting to the wired charging device and receiving a DC voltage and a DC current output by the wired charging device, to charge the battery 206.

In some embodiments, the charging management unit 203 is configured to perform boost or step-down processing on the direct current output by the wireless charging receiving unit 201 to obtain a first output voltage and a first output current. The first output voltage and the first output current meet the charging requirements of the battery 206 and can be directly loaded to the battery 206 for charging.

In some embodiments, the charging management unit 203 is further configured to perform boost or step-down processing on the direct current output by the wired charging connection unit 202 to obtain a second output voltage and a second output current. The second output voltage and the second output current meet the charging requirements of the battery 206 and can be directly loaded to the battery 206 for charging.

In some embodiments, the charging management unit 203 may include a voltage conversion unit, which may be a boost conversion circuit, a buck conversion circuit, a buck-boost conversion circuit, or a LDO voltage regulator circuit, and may also be a charge pump circuit, or even a direct charging circuit, which is not specifically limited in embodiments of the present disclosure.

In some embodiments, the control unit 204 is configured to control a path between the charging management unit 203 and the wireless charging receiving unit 201 to turn on once determining that the device to be charged is in the wireless charging mode, and control the path between the charging management unit 203 and the wired charging connection unit 202 to turn off once determining that the device to be charged is in the wired charging mode.

In some embodiments, the control unit 204 may be a separated Microcontroller Unit (MCU) in the device to be charged 20, and thus the reliability of the control can be improved. In some embodiments, the control unit 204 may also be an Application Processor (AP) in the device to be charged 20, thereby saving hardware cost. This is not specifically limited in embodiments of the present disclosure.

The detecting unit 205 is configured to detect a battery voltage and/or a battery current of the battery 206. The battery voltage and battery current may refer to a voltage value and/or a current value between the charging management unit 203 and the battery 206, i.e., an output voltage and/or an output current of the charging management unit 203.

In some embodiments, the detecting unit 205 may include a voltage detecting unit and a current detecting unit. The voltage detecting unit may be configured to sample the battery voltage and send the sampled voltage value of the battery to the control unit 204. In some embodiments, the voltage detecting unit may sample the battery voltage by voltage dividing based on a series circuit. The current detecting unit is configured to sample the battery current and send the sampled current value to the control unit 204. In some embodiments, the current detecting unit can sample the battery current through a current detection resistor and a galvanometer.

The control unit 204 is further configured to communicate with the wireless charging device, and feedback the voltage value and/or the current value detected by the detecting unit 205 to the wireless charging device. Thus, the wireless charging device can adjust a transmitting power of the wireless charging device based on the fedback voltage value and/or current value, such that the battery voltage value and/or the battery current value match the charging voltage value and/or charging current value required by the battery 206.

Based on the device to be charged as illustrated in FIG. 2, various embodiments of the present disclosure are described in detail below with reference to the accompanying drawings.

FIG. 3 is a flowchart of a charging control method according to an embodiment of the present disclosure. As illustrated in FIG. 3, the method is applicable for a device to be charged, and the method may include the following acts.

At block S301, in a charging process of the device to be charged, K constant current charging stages are performed on a battery in the device to be charged, in which K is a positive integer greater than or equal to 1.

At block S302, in each constant current charging stage of the K constant current charging stages, constant current charging is performed on the battery with a preset current corresponding to the constant current charging stage, until the battery is charged to a preset voltage corresponding to the constant current charging stage, in which the preset voltage corresponding to the Kth constant current charging stage is a charging cut-off voltage, and the charging cut-off voltage is greater than a rated voltage of the battery.

At block S303, when the voltage of the battery is detected to reach the charging cut-off voltage in the Kth constant current charging stage, the charging of the battery is stopped.

It should be noted that the charging process of the device to be charged may be divided into a plurality of constant current charging stages, and the number of the constant current charging stages is represented by K. K is a positive integer greater than or equal to 1, for example, K may be set to 5. However, in practical applications, K is specifically set according to actual conditions (e.g. the architecture of the battery and the materials used by the battery), which is not specifically limited in the embodiments of the present disclosure.

It should also be noted that the Kth preset voltage is used to represent the preset voltage corresponding to the Kth constant current charging stage, that is, the charging cut-off voltage of the battery in the device to be charged. Thus, in the last constant current charging stage, if it is detected that the voltage of the battery is equal to the charging cut-off voltage of the battery, the charging of the battery is directly stopped.

In embodiments of the present disclosure, in the charging process of the device to be charged, K constant current charging stages are first performed on the battery in the device to be charged, in which K is a positive integer greater than or equal to 1. In each constant current charging stage of the K constant current charging stages, the battery is charged by performing constant current charging with the preset current corresponding to the constant current charging stage until the battery is charged to the preset voltage corresponding to the constant current charging stage, in which the preset voltage corresponding to the Kth constant current charging stage is the charging cut-off voltage, and the charging cut-off voltage is greater than the rated voltage of the battery. When the voltage of the battery is detected to reach the charging cut-off voltage in the Kth constant current charging stage, the charging of the battery is stopped. The charging process adopts multi-stage constant current charging, and in the last constant current charging stage of the multi-stage constant current charging, when the voltage of the battery is equal to the preset voltage corresponding to the Kth constant current charging stage, the charging of the battery is stopped directly. That is, the charging process also cancels the constant voltage charging stage, which greatly saves time and moreover increases the charging speed.

In some embodiments, in each constant current charging stage of the K constant current charging stages, performing constant current charging on the battery with the preset current corresponding to the constant current charging stage until the battery is charged to preset voltage corresponding to the constant current charging stage, includes:
in the ith constant current charging stage of the first K−1 stages, performing constant current charging with an ith preset current on the battery until the battery is charged to an ith preset voltage, wherein i is a positive integer greater than or equal to 1 and less than or equal to K−1, an (i+1)th preset current is less than the ith preset current; and
in the Kth constant current charging stage, performing constant current charging with a Kth preset current on the battery until the battery is charged to a Kth preset voltage, wherein the Kth preset current is less than the (K−1)th preset current, and the Kth preset voltage is the charging cut-off voltage.

Moreover, in some embodiments, for each constant current charging stage in the K stages, the method further includes: detecting the voltage of the battery in each constant current charging stage.

It should be noted that the device to be charged includes a detecting unit (e.g. the detecting unit 205 as illustrated in FIG. 2). The detecting unit is generally connected in series in the circuit to be detected, and is configured to measure the current and/or voltage flowing in the circuit to be detected. In embodiments of the present disclosure, the detecting unit may be a resistor (e.g. a current detection resistor), or may be a magnetic device (e.g. a current transformer, a voltage transformer, a Rogowski coil, a Hall sensor), or a transistor (e.g. a drain-source on resistance (RDS(ON)), and a ratio-metric), which is not specifically limited in the embodiments of the present disclosure.

It should also be noted that, for each constant current charging stage (e.g. the ith constant current charging stage), the ith preset current and the ith preset voltage are respectively used to represent the current value and the voltage value of the device to be charged set in advance for the ith constant current charging stage. When the constant current charging is performed with a large current, the charging voltage may fall back after the charging is stopped. Therefore, as the number of i increases, the charging current decreases, that is, the (i+1)th preset current is smaller than the ith preset current. For example, suppose K is 5, in the first constant current charging stage, the first preset current is X (ampere), the first preset voltage is Y1 (volt); in the second constant current charging stage, the second preset current is X-$\Delta$A1, and the second preset voltage is Y2 (volt); in the third constant current charging stage, the third preset current is X-$\Delta$A1-$\Delta$A2, and the third preset The voltage is Y3 (volt); in the fourth constant current charging stage, the fourth preset current is X-$\Delta$A1-$\Delta$A2-$\Delta$A3, and the fourth preset voltage is Y4 (volt); and in the fifth constant current charging stage, the fifth preset current is X-$\Delta$A1-$\Delta$A2-$\Delta$A3-$\Delta$A4, and the fifth preset voltage is Y5 (volt). However, in practical applications, the ith preset current and the ith preset voltage are specifically set according to the actual situation (such as the architecture of the battery and the materials used by the battery), which is not specifically limited in embodiments of the present disclosure.

In embodiments of the present disclosure, the first preset current X may be a value greater than 3, for example, may be 4 A. From the second preset current to the fifth preset current, the value is gradually decreasing, that is, the current in latter stage is smaller than the current in the previous stage. For example, the value of $\Delta$A1, $\Delta$A2, $\Delta$A3, and $\Delta$A4 may be between 0.5 and 1. In some embodiments, the first preset voltage Y1, the second preset voltage Y2, the third preset voltage Y3, the fourth preset voltage Y4, and the fifth preset voltage Y2 may be the rated voltage of the battery or greater than the rated voltage of the battery. For example, assuming that the rated voltage of the battery is $V_0$, each of Y1 to Y5 may be equal to $V_0+\Delta V$, and $\Delta V$ may be between 0.05 and 0.5.

In some embodiments, in the K constant current charging stages, the preset voltages corresponding to respective constant current charging stages may be the same or different, and the preset voltage corresponding to each constant current charging stage may be greater than the rated voltage of the battery. In this way, overvoltage charging can be performed on the battery, thereby compressing the charging duration to the maximum extent and saving the charging time.

FIG. 4 is a schematic diagram of a charging control technology according to an embodiment of the present disclosure. As illustrated in FIG. 4, the abscissa represents time (T), and the ordinate represents charging current (I). It is assumed that the device to be charged has K constant current charging stages. First is the first constant current charging stage, in which the constant current charging is performed with a first charging current $I_1$. After a first charging time $t_1$, the battery is charged to a first limited voltage $V_1$, and the charging current is decreased from the first charging current $I_1$ to a second charging current $I_2$. Then, the second constant current charging stage is entered, in which constant current charging is performed with a second charging current $I_2$. After a second charging time $t_2$, the battery is charged to the second limited voltage $V_2$. The charging current is gradually decreased, and the above steps are repeated. If the charging current is reduced to the ith preset current $I_i$, the ith constant current charging stage is entered, in which the constant current charging is performed with a ith charging current $I_i$. After the ith charging time the battery is charged to the ith preset voltage $V_i$. Finally, in the last constant current charging stage, i.e., the K constant current charging stage, the constant current charging is performed with a Kth charging current $I_K$ to charge the battery to a Kth limited voltage $V_K$ (i.e., a charging cut-off voltage $V_{end}$), then the charging of the battery is stopped.

In some embodiments, the ith preset voltage is greater than the rated voltage of the battery.

It should be noted that, in the charging process of the device to be charged, the ith preset voltage represents a preset voltage of the battery in the ith constant current charging stage. The preset voltages corresponding to respective constant current charging stages may be the same or different, which is not specifically limited in the embodiments of the present disclosure. In some embodiments, the ith preset voltage may be greater than the rated voltage of the battery to perform overvoltage charging on the battery, thereby compressing the charging time to the maximum extent and reducing the duration of the constant voltage charging. Therefore, compared with the relevant technology, it can also greatly save the charging duration and improve the charging efficiency.

In some embodiments, the ith preset voltage may be set to a sum of the rated voltage of the battery and a preset voltage difference. The preset voltage difference $\Delta V$ may be 0.05V or 0.5V. Generally, $\Delta V$ may be selected between 0.05V and 0.5V. In practical applications, specific settings are made according to actual conditions, which is not specifically limited in embodiments of the present disclosure.

In some embodiments, in the ith constant current charging stage, after detecting the voltage of the battery in each constant current charging stage, the method further includes the following acts.

When detecting that the voltage of the battery is equal to the ith preset voltage, the device to be charged is controlled to enter the (i+1)th constant current charging stage, and constant current charging is performed on the battery with the (i+1)th preset current.

It should be noted that, in the ith constant current charging stage, constant current charging is performed on the battery in the device to be charged with the ith preset current until the battery is charged to the ith preset voltage. If it is detected that the voltage of the battery is equal to the ith preset voltage, it indicates that the ith constant current charging stage is completed, and the (i+1)th constant current charging stage is entered, and then constant current charging is performed on the battery with the (i+1)th preset current.

Thus, in the (i+1)th constant current charging stage, constant current charging is performed on the battery in the device to be charged with the (i+1)th preset current until the battery is charged to the (i+1)th preset voltage. The above steps are repeated. Moreover, if it is detected that the voltage of the battery is equal to the (K−1)th preset voltage, it indicates that the (K−1)th constant current charging stage is completed, and the Kth constant current charging stage is entered, and then constant current charging is performed on the battery with the Kth preset current. In the Kth constant current charging stage, constant current charging is performed on the battery in the device to be charged with a Kth preset current until the battery is charged to the Kth preset voltage (i.e., the charging cut-off voltage of the battery), at which time, it is detected that the voltage of the battery is equal to the Kth preset voltage, and charging of the battery is stopped.

In some embodiments, in the ith constant current charging stage, after detecting the voltage of the battery in each constant current charging stages, the method further includes: when detecting that the voltage of the battery is equal to the ith preset voltage, performing constant voltage charging on the battery with the ith preset voltage; and when detecting that the current of the battery is equal to the (i+1)th preset current, controlling the device to be charged to enter the (i+1)th constant current charging stage, and performing constant current charging on the battery with the (i+1)th preset current.

Further, in some embodiments, before detecting that the current of the battery is equal to the (i+1)th preset current, the method further includes: detecting the current of the battery in each constant current charging stage.

It should be noted that, for a plurality of divided constant current charging stages, each constant current charging stage can be connected with the next constant current charging stage through constant voltage charging. In this way, a sudden decrease of the charging current can be avoided. Since the sudden change of current has an impact on the material of the battery to a certain extent, it is easy to damage the battery, reduce the durability of the battery, thus shortening the service life of the battery. Therefore, the ith constant current charging stage may be connected with the (i+1)th constant current charging stage through constant voltage charging, which not only avoids the sudden change of the charging current, but also achieves the purpose of further saving charging time and increasing the charging speed.

Figure 5:
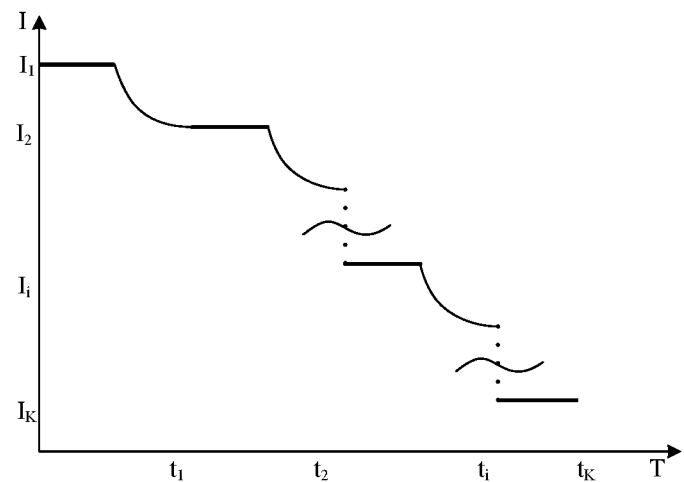
FIG. 5 is a schematic diagram of another charging control technology according to an embodiment of the present disclosure.

FIG. 5 is a schematic diagram of another charging control technology according to an embodiment of the present disclosure. As illustrated in FIG. 5, the abscissa represents time (T), and the ordinate represents charging current (I). It is assumed that the device to be charged has K constant current charging stages. First is the first constant charging stage, in which the constant current charging is performed with a first charging current $I_1$ until the battery is charged to a first preset voltage $V_1$, and then constant voltage charging is performed on the battery with the first preset voltage $V_1$. After the first charging time $t_1$, when it is detected that the current of the battery is equal to the second preset current $I_2$, the device to be charged enters the second constant current charging stage, in which constant current charging is performed with the second preset current $I_2$ until the battery is charged to the second preset voltage $V_2$, and then constant voltage charging is performed on the battery with the second preset voltage $V_2$. After the second charging time $t_2$, when it is detected that the current of the battery is equal to the third preset current $I_3$, the device to be charged enters the third constant current charging stage. The above steps are repeated. When the device to be charged enters the ith constant current charging stage, constant current charging is performed with the ith preset current until the battery is charged to the ith preset voltage $V_i$, and then constant voltage charging is performed on the battery with the ith preset voltage $V_i$. After the ith charging time when it is detected that the current of the battery is equal to the (i+1)th preset current $I_{i+1}$, the device to be charged enters the (i+1)th constant current charging stage. When the last constant current charging stage is entered, that is, when the device to be charged enters the Kth constant current charging stage, the constant current charging is performed with the Kth preset current $I_K$. When the voltage of the battery is detected to be equal to the Kth preset voltage $V_K$ (i.e., the charging cut-off voltage $V_{end}$ of the battery), the charging of the battery may be stopped. The constant voltage charging stage is cancelled in the charging process, and thus the purposes of saving charging time and increasing charging speed are achieved.

In some embodiments, the charging mode of the device to be charged includes a wireless charging mode and a wired charging mode, and the method further includes: controlling the device to be charged to charge the battery in the wireless charging mode or the wired charging mode by selecting the charging mode.

It should be noted that the charging control method according to embodiments of the present disclosure is applicable for both the wireless charging mode and the wired charging mode of the device to be charged. By selecting the charging mode, the device to be charged can charge the battery in the wireless charging mode or in the wired charging mode. Since the charging process adopts multi-stage constant current charging, and the constant voltage charging stage is cancelled, the purposes of saving charging time and increasing charging speed may be achieved.

In some embodiments, the battery includes a battery of a single-cell structure and a battery of a N-cell structure, in which N is a positive integer greater than one.

It should be noted that in the above charging control method, it is necessary to monitor whether the voltage of each cell reaches the preset voltage corresponding to the present constant current charging stage when the battery includes multiple cells. When the voltage of any one of the cells reaches the preset voltage corresponding to the present constant current charging stage, it is required to enter the next constant current charging stage. Or, in some embodiments, it is also possible to turn off the charging path of the cell, the voltage of which reaches the preset voltage corresponding to the present constant current charging stage, and continue performing charging on cells, the voltage of which does not reach the preset voltage corresponding to the present constant current charging stage. That is, for the multiple cells, each cell can be independently charged in the above-described charging control method.

Embodiments of the present disclosure provide a charging control method. The method is applicable for the device to be charged. In the charging process of the device to be charged, K constant current charging stages are performed on the battery in the device to be charged, wherein K is a positive integer greater than or equal to 1. In each constant current charging stage of the K constant current charging stages, constant current charging is performed on the battery with the preset current corresponding to the constant current charging stage until the battery is charged to the preset voltage corresponding to the constant current charging stage, wherein the preset voltage corresponding to the Kth constant current charging stage is the charging cut-off voltage, and the charging cut-off voltage is greater than the rated voltage of the battery. When the voltage of the battery is detected to reach the charging cut-off voltage in the Kth constant current charging stage, charging the battery is stopped. Since the charging process adopts multi-stage constant current charging, and the constant voltage charging stage is cancelled, the purpose of saving charging time and increasing charging speed is achieved.

Figure 6:
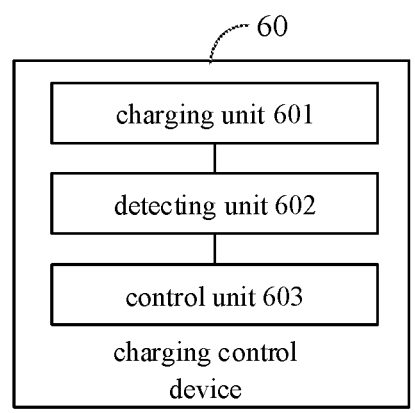
FIG. 6 is a block diagram of a charging control device according to an embodiment of the present disclosure.

On the basis of the same inventive concept of the foregoing technical solution shown in FIG. 3, as illustrated in FIG. 6, which is a block diagram of a charging control device 60 according to an embodiment of the present disclosure, the device 60 includes a charging unit 601, a detecting unit 602 and a control unit 603.

The charging unit 601 is configured to, in a charging process of the device to be charged, perform K constant current charging stages on a battery in the device to be charged, wherein K is a positive integer greater than or equal to 1.

The charging unit 602 is further configured to, in each constant current charging stage of the K constant current charging stages, perform constant current charging on the battery with a preset current corresponding to the constant current charging stage until the battery is charged to a preset voltage corresponding to the constant current charging stage, wherein the preset voltage corresponding to the Kth constant current charging stage is a charging cut-off voltage, and the charging cut-off voltage is greater than a rated voltage of the battery.

The control unit 603 is configured to, when the detecting unit 602 detects that the voltage of the battery reaches the charging cut-off voltage in the Kth constant current charging stage, stop charging the battery.

In the above solution, the charging unit is configured to: in the ith constant current charging stage of the first K−1 stages, perform constant current charging with an ith preset current on the battery until the battery is charged to an ith preset voltage, wherein i is a positive integer greater than or equal to 1 and less than or equal to K−1, an (i+1)th preset current is less than the ith preset current; and in the Kth constant current charging stage, perform constant current charging with a Kth preset current on the battery until the battery is charged to a Kth preset voltage, wherein the Kth preset current is less than the (K−1)th preset current, and the Kth preset voltage is the charging cut-off voltage.

In the above solution, the ith preset voltage is greater than the rated voltage of the battery.

In the above solution, the detecting unit 602 is configured to detect the voltage of the battery in each constant current charging stage.

In the above solution, in the ith constant current charging stage, the control unit 603 is configured to, when detecting that the voltage of the battery is equal to the ith preset voltage, control the device to be charged to enter the (i+1)th constant current charging stage, and perform constant current charging on the battery with the (i+1)th preset current.

In the above solution, in the ith constant current charging stage, the charging unit 601 is further configured to, when detecting that the voltage of the battery is equal to the ith preset voltage, perform constant voltage charging on the battery with the ith preset voltage.

The control unit 603 is further configured to, when detecting that the current of the battery is equal to the (i+1)th preset current, control the device to be charged to enter the (i+1)th constant current charging stage, and perform constant current charging on the battery with the (i+1)th preset current.

In the above solution, the detecting unit 602 is further configured to detect the current of the battery in each constant current charging stage.

In the above solution, the charging mode of the device to be charged includes a wireless charging mode and a wired charging mode, and the control unit 603 is configured to control the device to be charged to charge the battery in the wireless charging mode or the wired charging mode by selecting the charging mode.

In the above solution, the battery includes a battery of a single-cell structure and a battery of a N-cell structure, in which N is a positive integer greater than one.

It can be understood that, in this embodiment, the "unit" may be a partial circuit, a partial processor, a partial program or software, and may also be a module, or may be non-modular. In addition, respective functional units in respective embodiments of the present disclosure can be integrated into one processing unit, or can be present as separate physical entities. It is also possible that two or more than two units are integrated into one unit. The integrated units mentioned above can be realized either in the form of hardware or in the form of software functional modules.

If the integrated units are realized in form of functional software modules and are sold or used as separate products, they can be stored in a computer readable storage medium. Based on this understanding, the essential parts of the technical solutions (i.e. the parts making a contribution to the related art) or all or parts of the technical solutions can be embodied in form of software product, which is stored in a storage medium, and includes several instructions used for causing a computer device (for example, a personal computer, a server or a network device) or a processor to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

Accordingly, embodiments of the present disclosure provide a computer storage medium storing a charging control program that, when executed by at least one processor, the acts of the method described in the foregoing technical solution of FIG. 3 are implemented.

Figure 7:
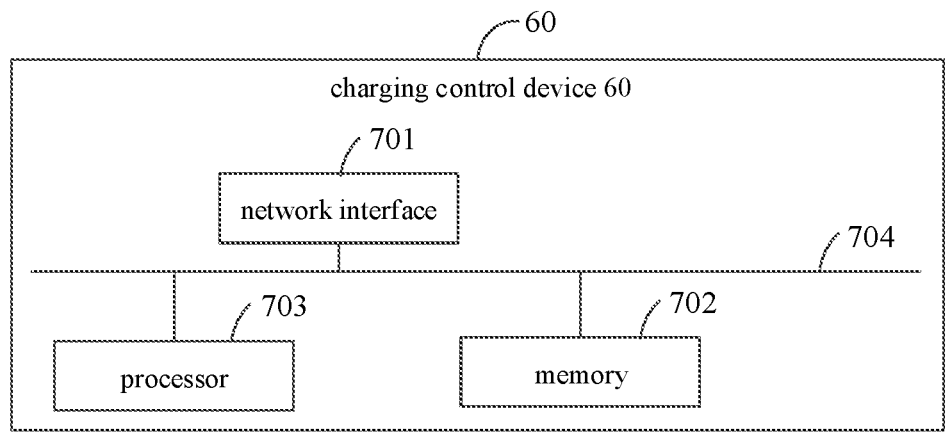
FIG. 7 is a schematic diagram of hardware of a charging control device according to an embodiment of the present disclosure.

Based on the composition of the charging control device 60 and the computer storage medium, as illustrated in FIG. 7, which is a schematic diagram of hardware of the charging control device 60 according to an embodiment of the present disclosure, the device includes: a network interface 701, a memory 702, and a processor 703. The components are coupled together by a bus system 704. It is understood that the bus system 704 is used to implement connection and communication between these components. In addition to a data bus, the bus system 704 further includes a power bus, a control bus, and a status signal bus. However, for clarity of description, various buses are labeled as bus system 704 in FIG. 7. The network interface 701 is configured to receive and send signals in the process of transmitting and receiving information with other external network elements.

The memory 702 is configured to store a computer program capable of running on the processor 703.

The processor 703 is configured to, when running the computer program, execute:

in a charging process of the device to be charged, performing K constant current charging stages on a battery in the device to be charged, in which K is a positive integer greater than or equal to 1;

in each constant current charging stage of the K constant current charging stages, performing constant current charging on the battery with a preset current corresponding to the constant current charging stage until the battery is charged to a preset voltage corresponding to the constant current charging stage, in which the preset voltage corresponding to the Kth constant current charging stage is a charging cut-off voltage greater than a rated voltage of the battery; and when the voltage of the battery is detected to reach the charging cut-off voltage in the Kth constant current charging stage, stopping charging the battery.

It is understood that the memory 702 in the embodiments may be a volatile memory or a non-volatile memory, or may include both volatile and non-volatile memory. Suitable non-volatile memories may include read only memory (ROM), programmable ROM (PROM), erasable programmable ROM (EPROM), electrically erasable programmable ROM (EEPROM), or flash memory. Volatile memories may include random access memory (RAM), which acts as an external cache. By way of illustration and not limitation, RAM is available in a variety of formats, such as static RAM (SRAM), dynamic RAM (DRAM), synchronous DRAM (SDRAM), double data rate SDRAM (DDR SDRAM), enhanced SDRAM (ESDRAM), sync link DRAM (SLDRAM), and direct rambus RAM (DRRAM). The memory 702 of the systems and methods described herein may include, but not limited to, these and any other suitable types of memory.

The processor 703 may be an integrated circuit chip with signal processing capabilities. In the implementation process, each act of the foregoing method may be completed by an integrated logic circuit in the processor 703 or instructions in a form of software. The processor 703 may be a general-purpose processor, a digital signal processor (DSP), an application specific integrated circuit (ASIC), a field programmable gate array (FPGA), or other programmable logic device, discrete gate, or a transistor logic device, or a discrete hardware component. The methods, steps, and logical block diagrams disclosed in the embodiments of the present disclosure can be implemented or executed. The general purpose processor may be a microprocessor or the processor may be any conventional processor or the like. The steps of the method disclosed in the embodiments of the present disclosure may be directly implemented by the hardware decoding processor, or may be performed by a combination of hardware and software modules in the decoding processor. The software module may be located in a conventional storage medium in the art, such as a random access memory, a flash memory, a read only memory, a programmable read only memory or an electrically erasable programmable memory, and a register. The storage medium is located in the memory 702, and the processor 703 reads the information in the memory 702 and completes the acts of the above method in combination with its hardware.

It is understood that the embodiments described herein may be implemented in hardware, software, firmware, middleware, microcode, or a combination thereof. For hardware implementation, the processing unit may be implemented in one or more Application Specific Integrated Circuits (ASICs), Digital Signal Processing (DSP), DSP Device (DSPD), Programmable Logic Device (PLD), Field-Programmable Gate Array (FPGA), general purpose processor, controller, microcontroller, microprocessor, other electronic unit for performing the functions described herein, or combination thereof.

For a software implementation, the techniques described herein can be implemented by modules (e.g., procedures, and functions) that perform the functions described herein. The software code can be stored in the memory and executed by the processor. The memory can be implemented in the processor or external to the processor.

Optionally, as another embodiment, the processor 703 is further configured to perform the steps of the method in the foregoing technical solution shown in FIG. 3 when running the computer program.

Figure 8:
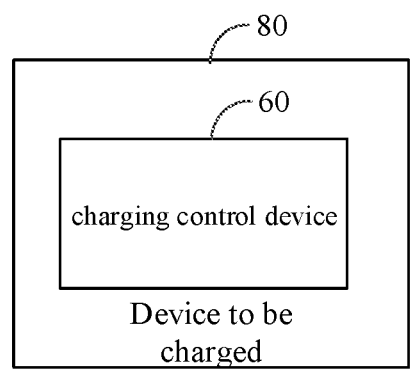
FIG. 8 is a block diagram of another device to be charged according to an embodiment of the present disclosure.

FIG. 8 is a schematic diagram of components of a device to be charged according to an embodiment of the present disclosure. As illustrated in FIG. 8, the device to be charged 80 includes at least a charging control device 60 as described in any of the foregoing embodiments.

It should be noted that the technical solutions described in the embodiments of the present disclosure may be arbitrarily combined without conflict.

The above is only the specific implementation of the present disclosure, but the scope of protection of the present disclosure is not limited to this. Any person skilled in the art can easily think of changes or substitutions within the scope of technology disclosed in the application, which shall be covered within the scope of protection of the present disclosure. Therefore, the scope of protection of the present disclosure shall be subjected to the scope of protection in the claims.

INDUSTRIAL APPLICABILITY

In embodiments of the present disclosure, the method is applicable for a device to be charged. In the charging process of the device to be charged, K constant current charging stages are performed on the battery in the device to be charged, wherein K is a positive integer greater than or equal to 1. In each constant current charging stage of the K constant current charging stages, constant current charging is performed on the battery with the preset current corresponding to the constant current charging stage until the battery is charged to the preset voltage corresponding to the constant current charging stage, wherein the preset voltage corresponding to the Kth constant current charging stage is the charging cut-off voltage that is greater than the rated voltage of the battery. When the voltage of the battery is detected to reach the charging cut-off voltage in the Kth constant current charging stage, charging the battery is stopped. Since the charging process adopts multi-stage constant current charging, which stops charging the battery after the Kth constant current charging stage, that is, cancels the constant voltage charging stage, the purpose of saving charging time and increasing charging speed is achieved.

What is claimed is:

1. A charging method, applicable for a device, comprising:
in a charging process of the device, performing at least one constant current charging stage on a battery in the device;
in a constant current charging stage of the at least one constant current charging stage, performing constant current charging on the battery with a current corresponding to the constant current charging stage until the battery is charged to a voltage corresponding to the constant current charging stage;
when detecting that a voltage of the battery is reach equal to the voltage corresponding to the constant current charging stage, performing constant voltage charging on the battery with the voltage corresponding to the constant current charging stage; and
when detecting that a current of the battery is equal to a current corresponding to a next constant current charging stage, controlling the device to enter the next constant current charging stage.

2. The method according to claim 1, wherein the at least one constant current charging stage comprises K constant current charging stages, and in the constant current charging stage of the at least one constant current charging stage, performing constant current charging on the battery with the current corresponding to the constant current charging stage until the battery is charged to the voltage corresponding to the constant current charging stage, comprises:
in an ith constant current charging stage of the first K−1 stages, performing constant current charging on the battery with an ith current until the battery is charged to an ith voltage, where i is a positive integer greater than or equal to 1 and less than or equal to K-1, an (i+1)th preset current is less than the ith current; and
in the Kth constant current charging stage, performing constant current charging on the battery with a Kth current until the battery is charged to a Kth voltage, wherein the Kth current is less than a (K−1)th current, and the Kth voltage is the charging cut-off voltage.

3. The method according to claim 2, wherein the ith voltage is greater than the rated voltage of the battery.

4. The method according to claim 1, further comprising:
when detecting that the voltage of the battery is equal to the ith voltage, controlling the device to enter an (i+1)th constant current charging stage, and performing constant current charging on the battery with the (i+1)th current.

5. The method according to claim 1, further comprising:
when detecting that the voltage of the battery is equal to the ith voltage, performing constant voltage charging on the battery with the ith voltage; and
when detecting that the current of the battery is equal to the (i+1)th current, controlling the device to enter an (i+1)th constant current charging stage, and performing constant current charging on the battery with the (i+1)th current.

6. The method according to claim 5, further comprising:
detecting the current entering the battery in each constant current charging stage.

7. The method according to claim 1, wherein a charging mode of the device comprises a wireless charging mode and a wired charging mode, and the method further comprises:
charging the battery in the wireless charging mode or the wired charging mode by selecting the charging mode.

8. The method according to claim 1, wherein the battery comprises one or more cells.

9. A device, comprising a charging unit, and a control unit, wherein the charging unit is configured to, in a charging process of the device, perform at least one constant current charging stage on a battery in the device;
wherein the charging unit is further configured to, in a constant current charging stage of the at least one K constant current charging stage, perform constant current charging on the battery with a current corresponding to the constant current charging stage until the battery is charged to a voltage corresponding to the constant current charging stage;

wherein the control unit is configured to, when detecting that a voltage of the battery is equal to the voltage corresponding to the constant current charging stage, perform constant voltage charging on the battery with the voltage corresponding to the constant current charging stage; and wherein the control unit is further configured to, when detecting that a current of the battery is charged equal to a current corresponding to a next constant current charging stage, control the device to enter the next constant current charging stage.

10. The device according to claim 9, wherein the at least one constant current charging stage comprises K constant current charging stages, and the charging unit is further configured to:

in an ith constant current charging stage of the first K−1 stages, perform constant current charging on the battery with an ith current until the battery is charged to an ith voltage, where i is a positive integer greater than or equal to 1 and less than or equal to K−1, an (i+1)th current is less than the ith current; and in the Kth constant current charging stage, perform constant current charging on the battery with a Kth current until the battery is charged to a Kth voltage, where the Kth current is less than a (K−1)th current, and the Kth voltage is the charging cut-off voltage.

11. The device according to claim 10, wherein the ith voltage is greater than the rated voltage of the battery.

12. The charging control device according to claim 9, further comprising a detecting unit, and wherein in the ith constant current charging stage, the control unit is further configured to, when the detecting unit detects that the voltage of the battery is equal to the ith voltage, control the device to enter an (i+1)th constant current charging stage, and perform constant current charging on the battery with the (i+1)th current.

13. The charging control device according to claim 9, further comprising a detecting unit, wherein the charging unit is further configured to:

when the detecting unit detects that the voltage of the battery is equal to the ith voltage, perform constant voltage charging on the battery with the ith voltage; and when the detecting unit detects that the current of the battery is equal to the (i+1)th current, control the device to enter an (i+1)th constant current charging stage, and perform constant current charging on the battery with the (i+1)th current.

14. The device according to claim 13, wherein the detecting unit is further configured to detect the current entering the battery in each constant current charging stage.

15. The device according to claim 9, wherein a charging mode of the device comprises a wireless charging mode and a wired charging mode, and the control unit is further configured to control the device to be charged to charge the battery in the wireless charging mode or the wired charging mode by selecting the charging mode.

16. The device according to claim 9, wherein the battery comprises one or more cells.

17. A device, comprising a memory and a processor, wherein the memory is configured to store a computer program capable of running on the processor, and the processor is configured to implement steps of a method when running the computer program, the method comprising:

in a charging process of the device, performing at least one constant current charging stage on a battery in the device;

in a constant current charging stage of the at least one constant current charging stage, performing constant current charging on the battery with a current corresponding to the constant current charging stage until the battery is charged to a voltage corresponding to the constant current charging stage;

when detecting that a voltage of the battery is equal to voltage corresponding to the constant current charging stage, performing constant voltage charging on the battery with the voltage corresponding to the constant current charging stage; and when detecting that a current of the battery is equal to a current corresponding to a next constant current charging stage, controlling the device to enter the next constant current charging stage.

18. The method according to claim 1, wherein the voltage corresponding to the last constant current charging stage is a charging cut-off voltage greater than a rated voltage of the battery.

19. The device according to claim 9, wherein the voltage corresponding to the last constant current charging stage is a charging cut-off voltage greater than a rated voltage of the battery.

20. The device according to claim 17, wherein the voltage corresponding to the last constant current charging stage is a charging cut-off voltage greater than a rated voltage of the battery.

* * * * *